Jan. 2, 1934.　　　R. MÉLIK-MINASSIANTZ　　　1,942,343

DIAL FOR VARIOUS APPARATUS

Original Filed Feb. 25, 1931

R. Melik-Minassiantz
　　　INVENTOR

By: Marks & Clerk
　　　　　Attys.

UNITED STATES PATENT OFFICE 1,942,343

DIAL FOR VARIOUS APPARATUS

Raphael Mélik-Minassiantz, Paris, France

Application February 25, 1931, Serial No. 518,200, and in France February 26, 1930. Renewed October 31, 1933

1 Claim. (Cl. 116—129)

The present invention relates to improvements in the new dial arrangement described in the U. S. application Ser. No. 485,216 of 29th September 1930.

It chiefly relates to the use of the dial upon speed-indicating apparatus mounted upon the instrument boards of land vehicles and aircraft, but this use is not of a limitative nature, and the apparatus may be employed for other purposes.

As in the U. S. application cited, the rotating or oscillating pointers cooperating with dials are to be replaced by simple movable indicating points which move before the scale divisions of the dial.

The said improvements serve to render the indications of the apparatus visible at night, due to a suitable illuminating arrangement. The indicating arrangement, which is herein specified as a point, consists of a translucent substance combined with a disk in which an aperture is formed which coincides with the said indicating point. This device covers the dial, of which only the part situated in the rear of the aperture is visible. The dial itself consists of a translucent substance and it is lighted from the rear. Thus a lighted portion of the dial will appear through the aperture, as well as the indicating point which is now luminous.

Another modification of the device consists in the use of an aperture formed in a stationary disk, and herein the dial rotates or oscillates, and thus the scale division corresponding to the reading which is to be made, will coincide with the aperture and the transparent indicating point.

Figure 2:
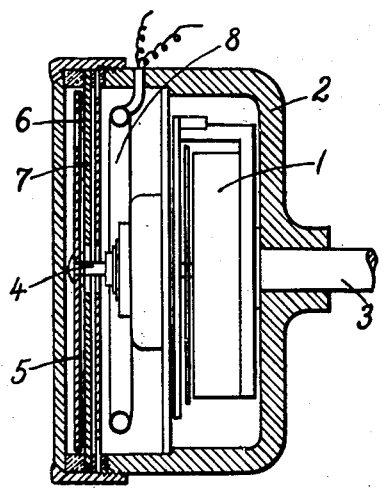
Fig. 2 is a sectional view showing the arrangement of the disks in the case containing the speed indicator.
Figure 1:
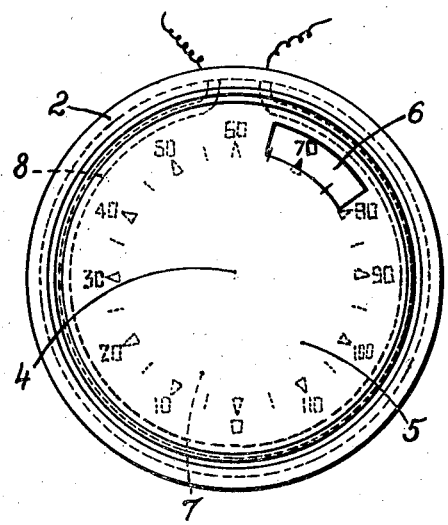
Fig. 1 is a front view of a speed indicator in which an aperture is movable in front of a stationary disk.

The speed indicator which is shown by way of example in Figures 1 and 2 is of the magnetic type employing a permanent magnet, but it may be of any other type. The whole mechanism of the indicator is mounted in a case 2. A shaft 3 enters said case, and it is driven by a flexible member, not shown. Upon the pivot shaft 4 which is affected by the magnetic currents, and in the place of the usual pointer, is an opaque disk 5 having an aperture 6; said disk is movable in front of a graduated dial 7 which consists of a translucent substance. At the rear of the dial is an illuminant, such as a neon tube 8 of annular form, and the tube will thus light the whole surface of the dial 7 in an approved manner. The terminals of the neon tube are connected to a lighting circuit.

It will be observed that while the light from the tube 8 can pass through the translucent dial 7, it cannot pass through the opaque disk 5, except at the point occupied by the aperture 6 in the said disk.

The opaque disk 5, when moving in front of the illuminated dial 7, will thus only allow the part of the scale coinciding with the said aperture to appear.

Figure 4:
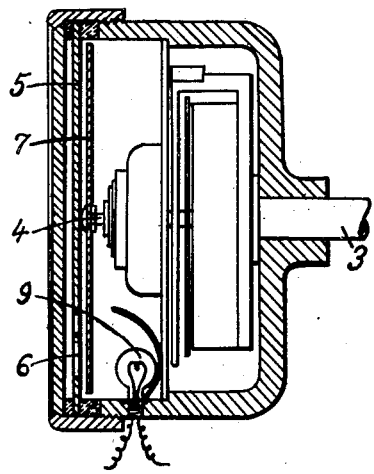
Fig. 4 is a sectional view of the device shown in Figure 3.
Figure 3:
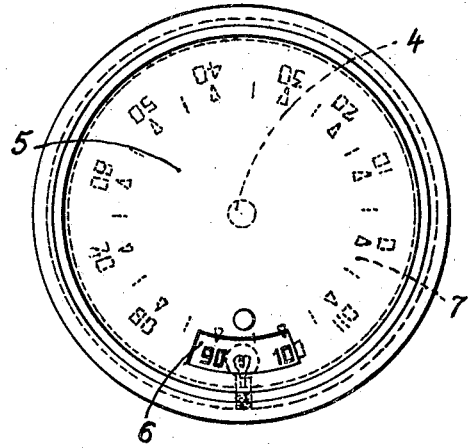
Fig. 3 is a front view of a speed indicator in which the disk is movable in the rear of an aperture.

In the arrangement represented in Figures 3 and 4, the graduated dial 7 is mounted on the pivot shaft 4, and as before, it consists of a translucent substance. It is movable in the rear of an opaque screen 5 which is provided at the lower part with an aperture 6. Adjacent the said aperture and at the rear of the dial 7 is mounted an electric lamp 9.

In this manner, the indications of the movable dial 7 will only appear when they are in coincidence with the aperture 8.

I claim:

In an apparatus for indicating a constantly variable value, illuminating means, relatively movable indicating members, one of said members being opaque and having a sight opening therein, the other member being translucent and having graduated markings thereon, said translucent member being interposed between the illuminating means and the opaque member whereby the portion of the graduated markings underlying the sight opening is rendered visible by the light penetrating through said translucent member, said translucent member being stationary and said opaque member with the sight opening being movable relatively to said translucent member, said graduated markings being arranged concentric with the axis of movement of the opaque member and said illuminating means being of substantially annular form and underlying substantially the entire graduated portion of the translucent member.

RAPHAEL MÉLIK-MINASSIANTZ.